May 11, 1965        N. L. DEAN        3,182,517

VARIABLE OSCILLATOR SYSTEM

Filed March 13, 1962        3 Sheets-Sheet 1

Norman L. Dean
INVENTOR.

BY *(signatures)*
Attorneys

May 11, 1965  N. L. DEAN  3,182,517
VARIABLE OSCILLATOR SYSTEM
Filed March 13, 1962  3 Sheets-Sheet 2

Norman L. Dean
INVENTOR.

May 11, 1965   N. L. DEAN   3,182,517
VARIABLE OSCILLATOR SYSTEM
Filed March 13, 1962   3 Sheets-Sheet 3

Norman L. Dean
INVENTOR.

United States Patent Office 3,182,517
Patented May 11, 1965

3,182,517
VARIABLE OSCILLATOR SYSTEM
Norman L. Dean, 3601 Wisconsin Ave. NW.,
Washington 16, D.C.
Filed Mar. 13, 1962, Ser. No. 179,294
11 Claims. (Cl. 74—61)

This invention relates to a method and an apparatus for producing harmonic motion or reciprocation, the amplitude and period of which may be cyclically varied for various purposes related to either particular output displacement requirements or variable output force requirements.

It is therefore a primary object of the present invention, to provide a new and useful mechanical movement capable of producing an oscillatory or reciprocatory output from a rotary input at a constant angular speed, the output motion being cyclically controlled both as to amplitude and period so as to control the cyclical duration of transmitted forces for various purposes. The nature of the output motion and the manner in which it is achieved, therefore represents a novel departure from mechanical movements heretofore devised.

Another object of the present invention is to provide a system for producing controlled harmonic motion without the use of fixed motion constraining linkages that have heretofore rendered rotating mechanical systems of the type involved unable to efficiently utilize or control accelerating forces generated as a result of relative movement of the parts of the rotating system. Accordingly, the system of the present invention produces reciprocatory movement without relying upon the constant force transmitting linkages in which high accelerating forces are generated as a result of rotation imparted thereto by a rotatable input.

The system of the present invention therefore, involves rotation of an eccentrically weighted rotor that is mounted on a slide member so as to induce harmonic reciprocation of the slide member in response to rotation of the rotor without any fixed linkage connection between the slide member and the frame which constrains movement of the slide member to slidable movement in one plane. In order to control and cyclically maintain the harmonic reciprocation so induced, a rotor displacing cam is engagable with the rotor assembly for engaging a point thereon at which no linear acceleration occurs in the direction of translation under conditions of continuous harmonic motion as induced by rotation of the rotor. As a result thereof, the center of motion with respect to which harmonic reciprocation occurs, may be cyclically shifted in order to vary the locus of the slide translation. The mechanism also includes means to cyclically limit the amplitude of slide reciprocation for a predetermined period during each cycle of reciprocation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
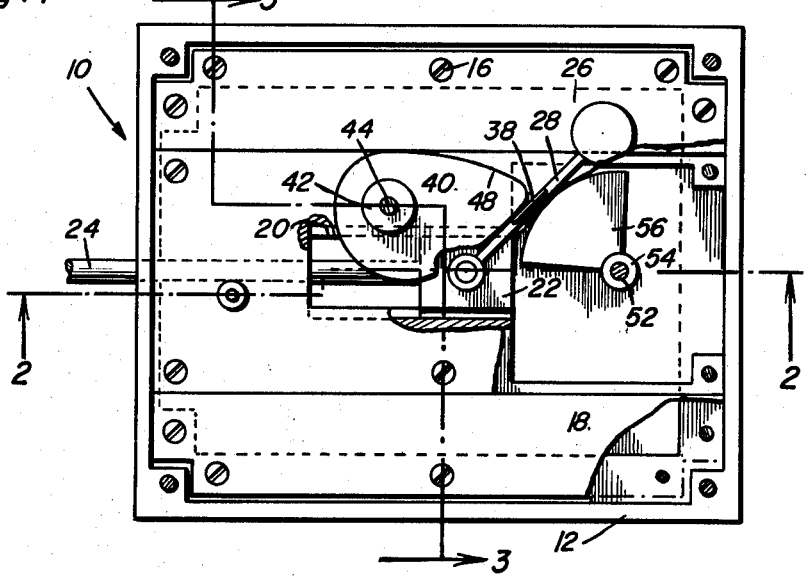
FIGURE 1 is a top plan view of one form of variable oscillator device with the housing lid removed and parts broken away.
Figure 2:
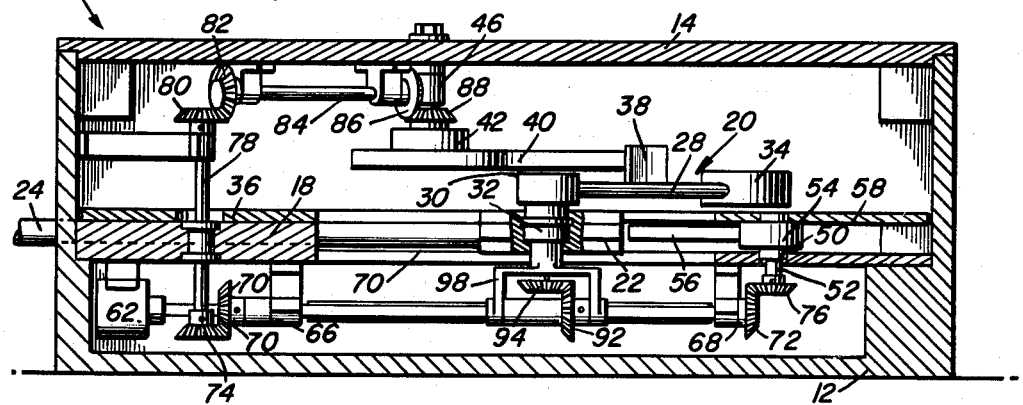
FIGURE 2 is a sectional view taken substantially through a plane indicated by section line 2—2 in FIGURE 1.
Figure 3:
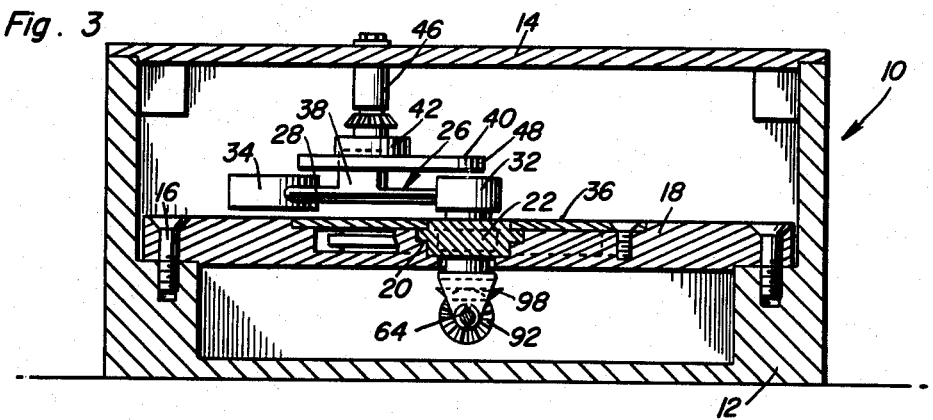
FIGURE 3 is a sectional view taken substantially through a plane indicated by section line 3—3 of FIGURE 1.

Referring to the drawings in detail, one form of mechanism generally referred to by reference numeral 10 is illustrated in FIGURES 1, 2 and 3. The mechanism 10 includes a casing or frame 12 for the device which may include a lid portion 14 secured thereto for supporting certain of the parts. It will be appreciated, however, that any suitable frame construction may be utilized for housing the relatively moving parts and/or for proper support thereof in accordance with the principles of the present invention. Securely mounted within the frame casing 12 by means of a plurality of fastener elements 16, is a slide supporting plate member 18. The slide supporting member therefore includes a slot 20 for receiving therewithin a slide assembly 22 thereby constrained to reciprocatory movement with respect to the frame 12. An output member 24 may therefore be secured to the slide assembly 22 for the purpose of transmitting reciprocatory movement of the slide assembly 22 to some device to be driven externally of the frame 12. Accordingly suitable guides are provided in the frame for the output member 24.

Rotatably mounted on the slide assembly 22, is a rotor assembly generally referred to by reference numerals 26. The rotor assembly 26 includes an arm 28 rotatably mounted about an axis affixed to the slide assembly 22 by means of a bearing assembly 30. Accordingly, the arm 28 is connected to a hub portion 32 which is connected to a shaft journalled in the bearing assembly 30 and by means of which rotation is imparted to the arm member 28. Connected to the radially outer end of the arm 28, is an eccentric mass or weight member 34 by virtue of which accelerating forces or centrifugal forces are developed in the rotor assembly 26 in response to rotation thereof, so as to induce harmonic motion in the slide assembly 22 mounting the rotor assembly. The harmonic motion so induced will therefore depend on the value of the eccentric mass 34, and its radial distance from the rotor axis passing through the bearing assembly 30 if no mechanical restraint is imposed upon the slide assembly 22 other than its guided mounting in the support plate 18. A retaining plate member 36 is secured to the support plate member 18 in order to confine reciprocatory movement of the slide assembly 22 to a single plane with respect to the frame casing 12. Located between the rotational axis of the rotor assembly 26, and the center of mass thereof, will be an equilibrium point at which no linear acceleration in the direction of slide translation exists because of the simultaneous rotational movement of the arm 28 and reciprocatory movement of the slide assembly 22 mounting the rotating arm. At this point, a cam follower element or projection 38 is mounted for engagement by a displacing cam assembly 40.

The cam assembly 40 includes a hub portion 42 connected to a cam shaft 44 rotatably mounted by a bearing assembly 46 affixed to the frame by means of the housing lid 14. The cam surface 48 is profiled for engagement with the cam follower 38 during a portion of an operative cycle so as to displace the rotating arm 28 and thereby the slide assembly 22 in a predetermined phase relationship to the harmonic motion induced therein in order to shift the center of motion or the center of the reciprocatory stroke associated with said harmonic motion as will be hereinafter explained. The support member 18 also rotatably mounts a bearing assembly 50 so as to define a cam shaft axis fixed with respect to the frame 12 about which the second cam shaft 52 is rotatable. Connected to the cam shaft 52 is the hub portion 54 of a segmental cam element 56 which constitutes an amplitude control element limiting movement of the slide assembly 22 for a predetermined period during each cycle. Accordingly, an opening 58 is formed in the support member 18 for accommodating rotational movement of the segmental cam element 56 across one end of the guide slot 20 into the path that may otherwise be assumed by the slide assembly 22 in the absence thereof.

Figure 4:
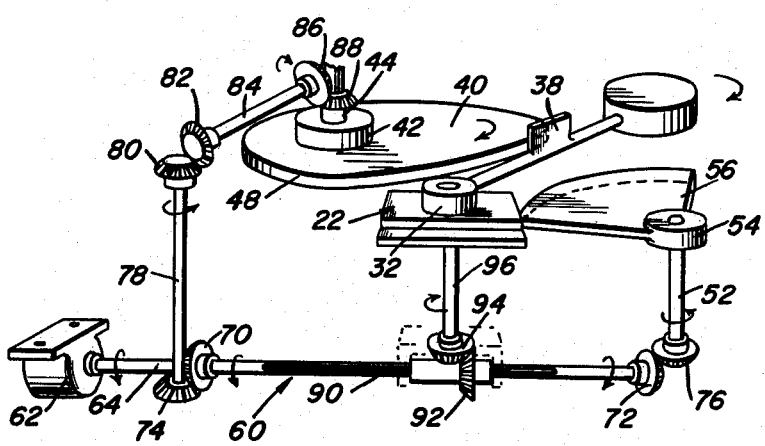
FIGURE 4 is a perspective view of the relatively movable parts of the mechanism disassembled from the frame.

Referring now to FIGURES 2 and 4 in particular, an input drive assembly generally referred to by reference numeral 60 is illustrated whereby the slide assembly 22, the rotor assembly 26, the displacing cam assembly 40 and amplitude control device 56 are all drivingly interconnected for operation in proper phase relationship to each other. An input motor or primer mover 62 is therefore securely fastened to the frame by means of the support plate member 18 and suspended therebelow in any convenient manner. The prime mover 62 may take any suitable form and is capable of imparting a constant rotational speed to the drive shaft 64 suitably journalled by bearing assemblies 66 and 68 supported below the support plate member 18. Affixed to the drive shaft 64 are a pair of bevel gears 70 and 72 respectively meshing with bevel gears 74 and 76 to impart rotation to shafts 78 and 52. The shaft 78 is drivingly connected by meshing gears 80 and 82 to a shaft 84 which in turn is drivingly connected by gears 86 and 88 to the cam shaft 44 for imparting rotational movement to the cam assembly 40. Slidably mounted by means of splines 90 on the drive shaft 64, is a gear assembly 92 which meshes with a gear element 94 connected to the rotor assembly shaft 96 which is journalled within the bearing assembly 30 for slidable displacement with the slide assembly 22. Accordingly, the sliding gear assembly 92 is rotatably and slidably mounted on shaft 90 about an axis perpendicular to the axis of the shaft 96 by means of the bracket 98. The drive shaft 64 will therefore impart rotation to the rotor shaft 96 at the same predetermined constant angular speed without imposing any restraint upon the slidable displacement of the slide assembly 22. The drive shaft 64 will also impart constant rotational speed to the displacing cam assembly 40 and the amplitude control element 56 which are rotatably mounted about axes fixed to the frame 12.

Figure 5:
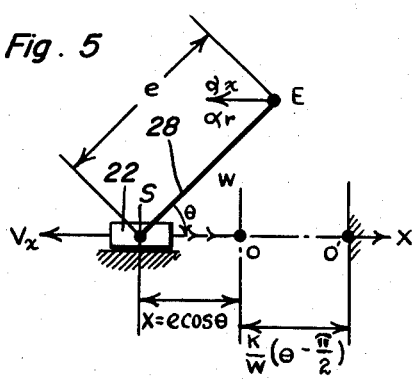
FIGURE 5 is a diagram illustrating certain relationships of the relatively moving parts of the mechanism.

Referring now to FIGURE 5, it will be observed that the slide assembly 22 and the rotor assembly mounted thereon are kinematically represented in some unknown phase position with the rotor arm rotating at its constant angular speed ($w$) in a clockwise direction as the slide assembly 22 is moving with harmonic motion in a leftward direction of translation along the path or slide axis represented by the X axis. Accordingly, the rotor axis on the slide assembly 22 represented by point S, is shown displaced from the center (O) of harmonic motion for the slide assembly by an amount $x$ as the rotor arm 28 is angularly displaced from the X axis by an angle ($\theta$). As hereinbefore mentioned, the equilibrium point E on the rotor arm 28 will be that point at which no linear acceleration exists in the direction of the X axis when the cam 40 is engaging the rotor arm 28 because of the combined movement of the rotor arm with respect to the rotor axis and the displacement of the rotor axis with the slide assembly 22. Inasmuch as the point E is being rotated with respect to the point S at a constant speed ($w$), it will be accelerated radially inwardly with respect to the moving point S by an amount $A_r = ew^2$. The linear component $A_x$ of this radial acceleration $A_r$ of point E along the X axis, will therefore be $A_x = ew^2$ cos $\theta$. Accordingly an equal and opposite acceleration or deceleration (acceleration opposite in direction to movement) must be imposed upon the slide assembly 22 along the X axis at point S in view of the equilibrium conditions at point E aforementioned. This deceleration $A_x$ is always opposite to the direction of slide translation inasmuch as the velocity of the slide assembly or point S is reduced to zero as it approaches the end of the reciprocatory stroke of the slide assembly. Since $$d\left(\frac{V_x}{dt}\right) = A_x$$

and $$A_x = -ew^2 \cos \theta,$$

where $$w = \frac{d\theta}{dt}$$

$$V_x = -ew \int \cos \theta d\theta$$

$$V_x = K - ew \sin \theta$$

since $$V_x = \frac{dx}{dt}$$

$$X = \frac{k}{w}\theta + e \cos \theta + k_1$$

When $$X = 0, \ \theta = \frac{\pi}{2}(90°)$$

and $$\cos \theta = 0$$

Therefore, $$0 = \frac{k\pi}{2w} + k_1$$

and $$X = \frac{k}{w}\left(\theta - \frac{\pi}{2}\right) + e \cos \theta$$

Where the displacement center is fixed at O, $k = 0$. Where the displacement center O is not fixed it is shifted as a function of $\theta$ and $k \neq 0$.

Therefore, the cam surface 48 on the motion center displacing cam 40, is designed to displace the point of equilibrium of the rotating arm 28 on the follower portion 38, in accordance with the expression $$X = \frac{k}{w}\left(\theta - \frac{\pi}{2}\right)$$

in order to displace the center of harmonic motion of the slide assembly 22 without linear acceleration thereof along the slide axis so as to avoid disturbing the harmonic motion induced along said slide axis by rotation of the arm 28 at a constant angular speed ($w$). During each operative cycle when the rotor is at a phase position where $\theta = 0$, the cam 40 leaves contact with the rotor arm and the center of harmonic motion will be displaced from its initial location at O, to a location at O' as represented in FIGURE 5 equal to an amount $$\left(-\frac{k}{2w}\right)$$

the negative sign indicating the displacement of the motion center in a forward direction for example opposite to the slide movement to point O'. The amplitude limiting cam 56 is then operative to engage the slide assembly 22 as the displacing cam 40 leaves contact occurring before the end of the slide stroke. The motion center for the slide assembly will therefore be shifted back to its original position O upon the frame so that its reciprocation stroke may be completed under inducement of the rotor movement. Also, when shifted back to the original position, contact of the rotor arm by the displacing cam 40 may be reestablished in order to begin a new cycle of operation. The amplitude limiting cam may therefore be profiled and phased so as to constrain movement of the slide assembly, during a portion of its reciprocation cycle in one direction to thereby transfer to the frame those accelerating forces that would otherwise produce movement of the slide assembly during the latter portion of the reciprocatory cycle, and without disturbing the harmonic movement of the slide during the remainder of the cycle. It will therefore be apparent, that the rotating parts of the device may be designed in accordance with the foregoing principles and indicated relationships to achieve controlled harmonic movement modified by a cyclic shift in the motion center without the use of the usual motion constraining linkages so as to directly transfer additional predetermined forces to the frame during the portion of the cycle predetermined by the cam 56.

The amount of the shift of the center of harmonic motion and the stroke of the slide assembly with respect to the frame may be varied. This may be accomplished by varying the stroke and phasing of the displacing cam and amplitude limiting cam so as to shift the harmonic motion center within the restrictions of the aforementioned formulae.

Figure 6:
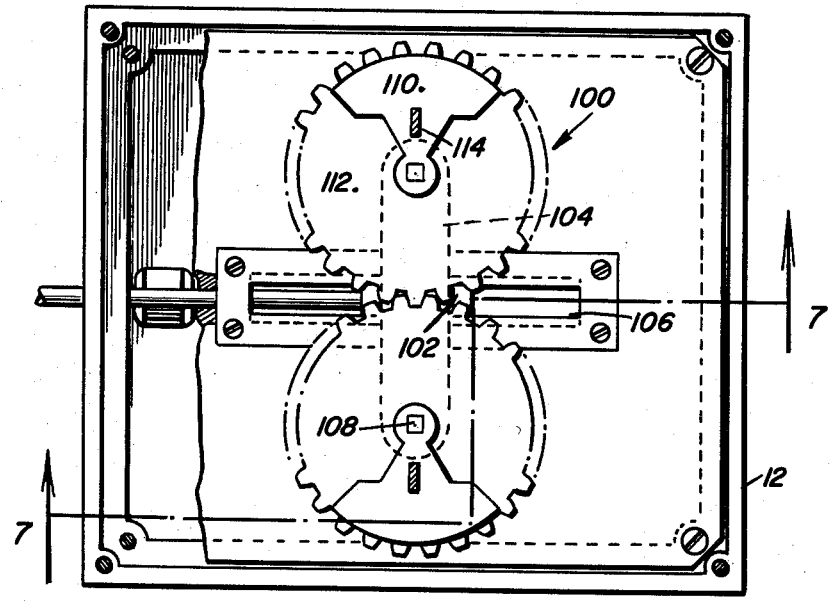
FIGURE 6 is a top plan view of another form of variable oscillator device with the lid removed and parts broken away and shown in sections.
Figure 7:
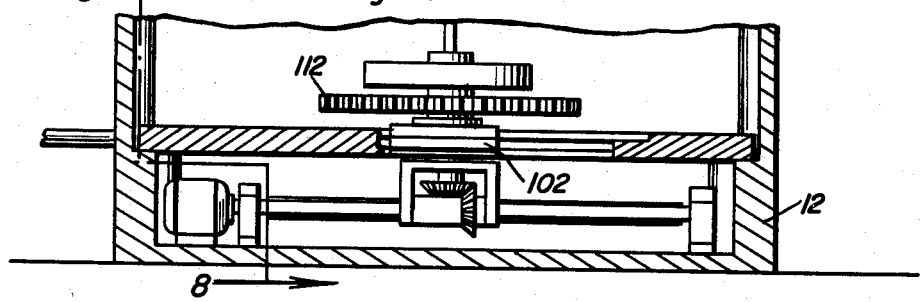
FIGURE 7 is a partial sectional view of a device illustrated in FIGURE 6 taken through a plane indicated by section lines 7—7 in FIGURE 6.
Figure 8:
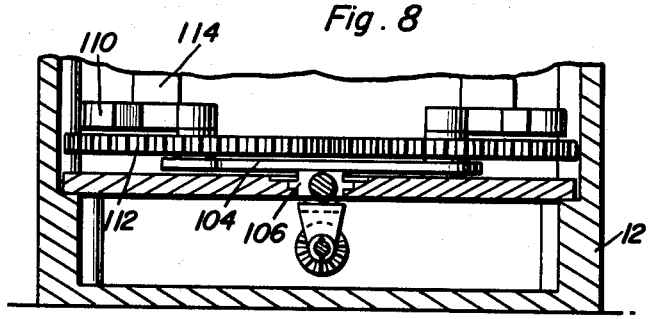
FIGURE 8 is a partial sectional view taken substantially through a plane indicated by section line 8—8 in FIGURE 7.

From the foregoing description, it will be appreciated that the system will theoretically operate when the effect of dynamic unbalance on the frame is neglected as well as frictional forces that may modify the motion imparted to the slide assembly 22. To compensate for dynamic unbalance effects on the frame, the rotor assembly may be modified as illustrated in FIGURES 6, 7 and 8. In the modified form of the device, the rotor assembly 100 is mounted on the slide assembly 102 by means of a laterally projecting member 104 affixed thereto and disposed perpendicular to the guide slot 106 constraining reciprocatory movement of the slide assembly 102 with respect to the frame 12. Adjacent opposite ends of the member 104, are mounted a pair of rotor shafts 108 carrying therewith eccentric mass elements 110. The eccentric elements 110 are respectively connected to intermeshing gear elements 112 whereby the elements 110 rotate at the same speed but in opposite rotational directions. Accordingly, the dynamic unbalance effects of one rotor element will be counterbalanced by the effects of the other rotor element during each cycle of operation. Accordingly, each of the eccentric rotor elements 110 has a cam projection 114 affixed thereto and located at the point of equilibrium for cooperation with two separate displacing cam assemblies in a manner similar to that described with respect to the single rotor arm 28 described with respect to FIGURES 1–4. Accordingly, an input drive assembly will also be provided similar to that described with respect to FIGURES 1–4. Also, an amplitude control device similar to the segmental cam element 56 will be provided in connection with this latter form of the device.

It will also be appreciated, that other but equivalent amplitude control devices may be utilized in place of the segmental cam element 56 such as controlled clutch or restricting devices operative to restrict movement of the slide assembly in one direction during a predetermined portion of the cycle while releasing it for movement in the other direction under the inducement of the rotor assembly and the displacing cam assembly. Such clutch or restricting devices may therefore be attached to the frame or the slide assembly.

From the foregoing description, operation and utility of the variable oscillatory device will be apparent. It will be therefore appreciated that the system of the present invention involves the conversion of a constant rotational input movement into an oscillatory output movement wherein the output movement is produced with respect to a shifting center of motion. As a result thereof, the output movement may be controlled in accordance with special displacement and/or force requirements. It will also be appreciated, that the variable output motion is achieved in a novel manner without the constant linkage connections and/or force transmission ordinarily associated with devices of this type. Accordingly, a novel and purposeful departure in the transmission of forces is achieved because of the described kinematic relationship which govern operation of the mechanical system. It will be appreciated of course, that the system while described in terms of specific but exemplary mechanical components, is not confined to such specific components or methods.

The foregoing is considered as illustrative only of the principles of the invention. Further, since numerous modification and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A system for producing harmonic motion with respect to a shfiting center of movement comprising, frame means, slide means reciprocably mounted by the frame means, rotor means mounted on the slide means operative in response to rotation thereof for inducing harmonic motion of the slide means relative to a center of movement located at one position on the frame means, displacing means operatively mounted on the frame means and cyclically engageable with the rotor means for regulating displacement of said center of movement without disturbing said harmonic motion of the slide means and movement limiting means operatively mounted on said frame means and engageable with said slide means in phase relation to said cyclic engagement of the displacing means for inducing shifting of said center of movement to said one position on the frame means.

2. The combination of claim 1, including drive means mounted on said frame means and drivingly connected to said rotor means, said displacing means, and said movement limiting means for cyclic operation thereof in fixed phase relationship.

3. The combination of claim 2, wherein said rotor means comprises an arm rotating at a predetermined constant angular speed about a rotor axis fixed to said slide means, and an eccentric mass fixed to said arm for inducing harmonic motion of the slide means in response to rotation of said arm at said constant angular speed producing an equilibrium point on the arm between the eccentric mass and rotor axis having no linear acceleration in the direction of movement of the slide means.

4. The combination of claim 3, wherein said displacing means comprises a cam rotatably mounted about an axis fixed to said frame means and a follower fixed to said arm at said equilibrium point for engagement by the cam to constrain movement of said point to non-accelerated linear displacement in said direction of movement of the slide means.

5. The combination of claim 4, wherein said movement limiting means comprises amplitude control means operative to restrict relative movement of slide means in one direction with respect to the frame means.

6. The combination of claim 5 wherein said amplitude control means includes, a segmental cam rotating at said predetermined constant angular speed about an axis fixed to said frame means.

7. The combination of claim 1, wherein said rotor means includes a pair of rotor assemblies drivingly interconnected for rotation in opposite directions, each rotor assembly comprising an arm rotating at a predetermined constant angular speed about a rotor axis fixed to said slide means, and an eccentric mass fixed to said arm for inducing harmonic motion of the slide means in response to rotation of said arm at said constant angular speed cyclically producing an equilibrium point on the arm between the eccentric mass and rotor axis having no linear acceleration in the direction of movement of the slide means.

8. The combination of claim 7 wherein said displacing means comprises a cam rotatably mounted about an axis fixed to said frame means and a follower fixed to said arm at said equilibrium point for engagement by the cam to constrain movement of said point to nonaccelerated linear displacement in said direction of movement of the slide means.

9. The combination of claim 8 wherein said movement limiting means comprises amplitude control means operative to restrict relative movement of said slide means in one direction with respect to the frame means.

10. The combination of claim 1 wherein said movement limiting means comprises amplitude control means operative to restrict relative movement of said slide means in one direction with respect to the frame means.

11. A variable oscillator device comprising, reciprocably mounted rotor means, drive means operatively connected to the rotor means for inducing harmonic translation of the rotor means with respect to a center motion through a predetermined cycle, displacing means drivingly connected to the drive means and cyclically engageable with said rotor means for constraining displacement thereof in accordance with harmonic translation relative to said center of motion and amplitude control means operatively engageable with said motor means in phase relation with the displacing means for restricting said translation during a portion of said predetermined cycle to effect displacement of said center of motion.

References Cited by the Examiner
UNITED STATES PATENTS

| | | | |
|---|---|---|---|
| 1,116,124 | 11/14 | Rojohn | 74—87 |
| 1,386,329 | 8/21 | Goldschmidt | 74—61 |

References Cited by the Applicant
UNITED STATES PATENTS

| | | |
|---|---|---|
| 2,188,482 | 1/40 | Parks. |

BROUGHTON G. DURHAM, *Primary Examiner.*